UNITED STATES PATENT OFFICE.

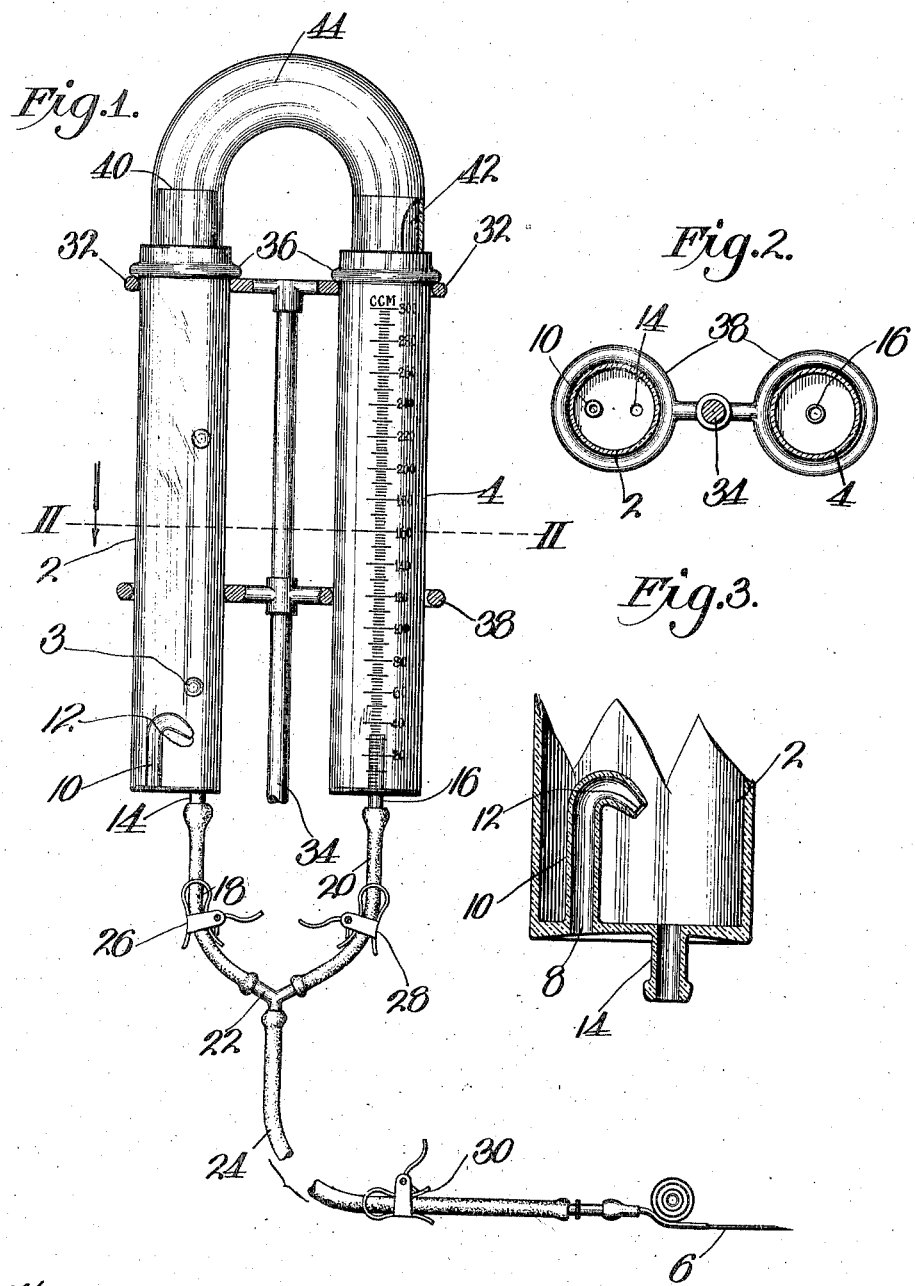

JOSEPH LANDIS OWENS, OF KANSAS CITY, MISSOURI.

INTRAVENOUS-INJECTION APPARATUS.

1,084,753.

Specification of Letters Patent. Patented Jan. 20, 1914.

Application filed March 10, 1913. Serial No. 753,289.

*To all whom it may concern:*

Be it known that I, JOSEPH LANDIS OWENS, a citizen of the United States, residing at Kansas City, in the county of Jackson and State of Missouri, have invented certain new and useful Improvements in Intravenous - Injection Apparatus, of which the following is a specification.

This invention relates to apparatus for intravenous injections designed for use in surgery in connection with treatments involving the injection of solutions into the veins, for example in the treatment of malaria, and my object is to produce a device of this character whereby the operator may at all times know whether or not the solution is being discharged into a vein.

A further object is the construction of apparatus in which the needle tube will be protected against the entrance of any foreign particles along with the solution as it passes into the tube so that only the clear solution will arrive at the needle.

Another object aimed at is a device so constructed that in its use the operator may always observe and accurately estimate the quantity of fluid which is passing through the needle.

A further object is the production of such an apparatus in a form in which the flow of the solution will always be steady and constant as well as subject to regulation at all times by the operator.

With these and other objects in view as will appear in the course of the description, my invention comprises certain details and combinations of parts which I will proceed to describe in connection with one embodiment or form that my invention is adapted to take, and for a full understanding thereof, reference is to be had to the accompanying drawing, in which—

Figure 1, is a side elevation of the apparatus mounted ready for use. Fig. 2, is a horizontal section along the line II—II of Fig. 1, and Fig. 3, is a broken vertical section through the lower end of one of the glass tubes.

Referring to the drawing two separate glass tubes 2 and 4 are used for holding the necessary solutions, the tube 2 being an indicator tube to be filled with a normal salt solution or pure sterilized water, and the tube 4, being a graduated tube, as shown to be filled with a solution to be injected through the intravenous needle 6. Extending from the bottom of the tube 2 are a short air inlet tube 10 and a short liquid outlet tube 14. The inlet tube extends inward from the bottom of the tube 2, providing an inlet opening 8 and terminating preferably in an upper return-bend with a constricted end having a small opening 12, communicating with the interior of tube 2. The tube 4 has a central opening through its bottom, formed by a short tube 16 extending upward from the bottom an inch or so for a purpose which is hereinafter explained. The lower ends of the tubes 14 and 16 are connected by rubber tubes 18 and 20 to a three-way connection 22, which communicates with the needle 6 through a rubber tube 24. Tubes 18, 20, and 24 are provided respectively with pinch clamps 26, 28 and 30. For suitably supporting the glass tubes 2 and 4 in the rings 32, of a stand 34, the tubes are formed near their upper ends with ribs or shoulders 36 for engaging the upper surfaces of said rings, the stand being also provided with rings 38, for steadying the lower ends of the tubes.

Upon the upper ends of the glass tubes are formed reduced hollow extensions 40 and 42 as shown, these extensions being ground and of a diameter to fit the inner ground surfaces of corresponding bores at the ends of a U-shaped cap 44, which serves as an air-tight connection between the tubes 2 and 4.

In preparing the apparatus for use, the cap 44 is removed and the opening 8 in the indicator tube 2 is closed (by the thumb, or by a glass stopper, if desired) and a plain solution introduced into said tube 2, it being understood that the rubber tubes 18 and 20 are meanwhile closed by their clamps. The tube 4, is likewise filled with the solution to be injected, and as this solution is often prepared from substances which are not readily soluble, so much so that glass beads are employed in preparing the solution, it frequently happens that undissolved particles and even fine pieces of the beads will settle and collect at the bottom of tube 4. Consequently to guard against such solid particles entering the tube 20 and passing with the clear solution to the needle, the tube 16 extends up from the bottom of tube 4 so as to present its mouth at a safe distance above any deposits of this character. Then the tubes 2 and 4 are both placed in the stand 34 and the cap 44 applied. Now the tube 10 and clamp 26 are opened to allow the liquid to flow through the tubes 18 and 24, thereby forcing the air out of said tubes. Clamp 26 is then closed and clamp 28 opened to remove the air from tube 20, after which the clamp 30 is closed.

In operation the tubes 2 and 4 are raised to a sufficient height on the stand 34, and the needle 6 inserted into the part which is to receive the injection. As the fluid leaves either of the glass tubes air must of course enter at the opening 8 to replace it, and the rate of flow from the tubes and hence through the needle, may be accurately estimated from the rate at which the bubbles 3 form at the opening 12 and pass through the indicator tube 2 to the air space in the cap 44. Unless the needle is properly located with its opening squarely in the vein it will be understood that the flow through it will not take place freely and consequently the bubbles in the indicating tube will rise at a correspondingly slow rate but as soon as the needle is positioned squarely in the vein the flow will be rapid and the rise of air bubbles accelerated accordingly. This proper position of the needle is secured before any of the solution in tube 4 is allowed to flow into the tube 20, because of the irritating effect which frequently results from the escape of the medicated solution into the tissues, whereas the plain solution will not have such disagreeable effect. After the needle has been properly located, the clamp 26 is closed and tube 20 opened for the discharge of the solution from tube 4, which can thereafter be regulated by means of either of the clamps 28 or 30.

A steady flow from the solution tubes is gained by the peculiar construction of the air inlet tube 10 having the constricted and preferably curved upper end communicating through a small opening 12 with the interior of the tube 2. I have found by experiment that so long as the tube 10 is of uniform diameter throughout, some liquid will be forced out through it, no matter how small the diameter may be. This is due to differences in pressure at slight intervals over the columns of liquid in tubes 2 and 4 as air enters the one and liquid leaves the other, and the result is a pumping action in tube 2 so long as a tube 10 of uniform diameter is used, so that the liquid is gradually forced out at the opening 8, and the pumping action increases as the volume of air is increased while the flow from the needle tube is also materially affected. This fault, however, I find to be completely cured by the curved and constricted form of the tube 10 which I have illustrated, and which I would explain as having a sort of nozzle effect whereby air is enabled to enter the tube 2 with sufficient pressure to support the liquid against the reaction under any slight variations in the pressure above. As a consequence no water whatever escapes through the tube 10 and the flow through the tubes 18 and 20 is maintained absolutely steady and uniform.

While the above represents what I regard as the preferred form of my device, the same is of course susceptible of various modifications;—for example, the air inlet tube 10 and the liquid discharge tube 16 can be used in connection with a single glass tube 4, though I find currents are sometimes established which are objectionable as disturbing the deposits at the bottom of the tube. However, I desire to reserve to myself the right to all such changes and modifications as may properly fall within the scope of the following claims.

I claim—

1. In a device of the character described, a liquid receptacle, an air inlet tube and a liquid discharge tube both communicating with said receptacle, said discharge tube being positioned to allow escape of the liquid from the receptacle by gravity, said air inlet tube having an air receiving opening and a constricted air discharge opening for supplying air to said receptacle to replace the liquid as discharged.

2. In a device of the character described, a liquid receptacle, an air inlet tube and a liquid discharge tube both communicating with said receptacle, said discharge tube being positioned to allow escape of the liquid from the receptacle by gravity, said air inlet tube having an air receiving opening and a constricted air discharge opening for supplying air to said receptacle to replace the liquid as discharged, and said liquid discharge tube having its receiving opening spaced above the bottom of said receptacle.

3. In an apparatus for intra-venous injections, a liquid receptacle having two liquid compartments communicating with each other through a sealed air compartment, one of said liquid compartments having an air inlet opening and the other liquid compartment having a liquid discharge opening.

4. An apparatus for intra-venous injections comprising a liquid receptacle having two liquid compartments communicating with each other through an air compartment, one of said liquid compartments having an air inlet tube provided with an air receiving opening and a constricted air discharge opening, and the other liquid compartment having a liquid discharge opening.

5. An apparatus for intra-venous injections comprising a liquid receptacle having two liquid compartments communicating with each other through an air compartment, each of the liquid compartments having a liquid discharge opening and one of the liquid compartments having also an air inlet opening, and a needle tube having branches connected with both of said discharge openings.

6. An apparatus for intra-venous injections comprising a liquid receptacle having two liquid compartments communicating with each other through an air compartment, each of the liquid compartments having a liquid discharge opening and one of the liquid compartments having also an air inlet tube provided with an air receiving opening and a constricted air discharge opening, and a needle tube having branches connected with both of said liquid discharge openings.

7. An apparatus for intra-venous injections comprising an indicator tube for holding liquid, said tube having a liquid discharge opening, an air inlet tube projecting upward from the bottom of said indicator tube and having a constricted inner end, a solution holding tube, a discharge tube extending through and above the bottom of said solution tube, an inverted U-shaped air tube joining the tops of said indicator and solution tubes and forming an air-tight connection between them, and a needle tube having branches connected with said discharge opening and said discharge tube.

In testimony whereof I affix my signature in presence of two witnesses.

JOSEPH LANDIS OWENS.

Witnesses:
CHAS. W. GERARD,
G. Y. THORPE.